3,061,534
CONTROL FOR STRIP PROCESSING LINE
William R. Jasperson, Gary, Ind., assignor to United States Steel Corporation, a corporation of New Jersey
Filed Sept. 4, 1959, Ser. No. 838,160
4 Claims. (Cl. 204—211)

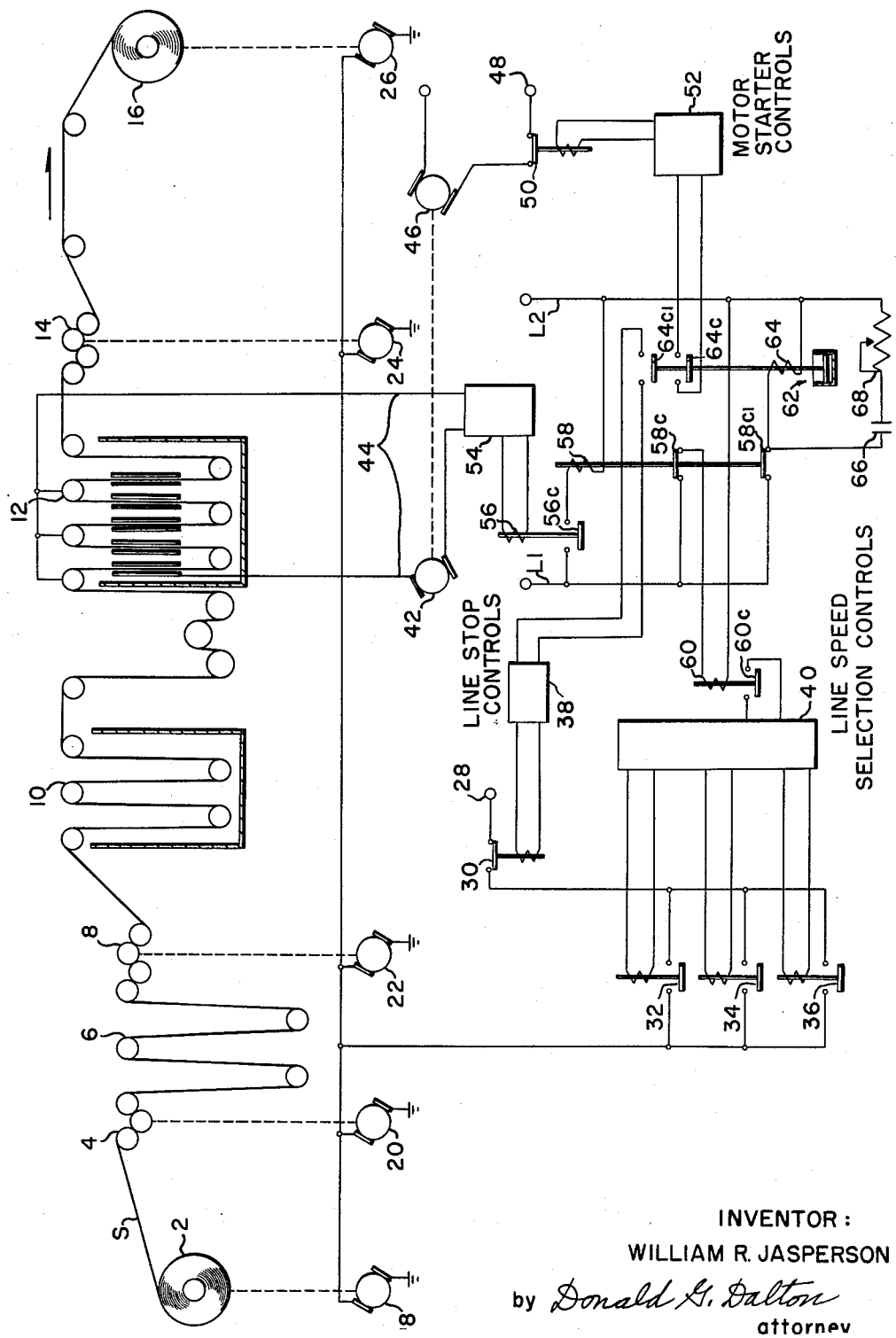

This invention relates to a control for a strip processing line having a generator for supplying power to the processing section of the line and is particularly adapted to plating lines such as electrolytic tinning lines. The control used prior to my invention was such that the line was stopped when the generator or generators became overloaded. When an electrolytic tinning line stopped there was a loss of from 500 to 700 ft. of commercial tin plate due to the chemical reactions that take place when the line is stopped. In addition there was generally a delay of from 5 to 10 minutes for each stop. Also, because of the labor situation, it was required that an electrician be summoned to restart the motor generator sets before the line could be started again. Starting and stopping of the line also causes wear on the motors, controls, rolls, drives and other line equipment. Prior to my invention the electrolytic tinning line might be stopped as many as 15 times in 8 hours from this cause and it was seldom that the line was not stopped at least 3 times.

It is therefore an object of my invention to provide a control for a continuous strip processing line which will eliminate or greatly reduce the number of stoppages of the line due to overload on generators used in the process.

This and other objects will be more apparent after referring to the following specification and attached drawings, in which the single FIGURE is a schematic drawing of my control as applied to a continuous strip electrolytic tinning line.

Referring more particularly to the drawing reference numeral 2 indicates an uncoiler for supporting a coil of strip S. From the uncoiler 2 the strip S passes through a bridle 4, a strip storage section 6, a second bridle 8, cleaning section 10, plating section 12, and a drive bridle 14 to a coiler 16. A drive motor or generator 18 is provided for the uncoiler 2 and drive motors 20, 22 and 24 are provided for the bridles 4, 8 and 14, respectively. A drive motor 26 is provided for the coiler 16. The motors 18, 20, 22, 24 and 26 are used to pull the strip S through the line under controlled tensions. Power for the motors is supplied from a power source 28 through contacts 30, 32, 34 and 36. A control 38 is provided for the contact 30 and a line speed selection control 40 is provided for the contacts 32, 34 and 36. Depending upon whether the control 40 closes contact 32, 34 or 36 the line will operate at high, medium, or low speeds, respectively. A low voltage generator 42 is connected by means of a circuit 44 to the anodes and rolls of the plating section 12. Motor 46 which drives the generator 42 is connected to a power source 48 through a contact 50. A control 52 closes and opens contact 50 to start and stop motor 46. The parts so far described are conventional parts of an electrolytic tinning line. It will be understood that additional equipment may be provided in the actual installation.

According to my invention I insert a current sensing device 54 in circuit 44. The current sensing device 54 may be a shunt, a current transformer or any other standard unit. A relay coil 56 is connected to the current sensing device 54 and is provided with a normally open contact 56C. Contact 56C is connected across lines L1, L2 in series with a relay coil 58 which has normally closed contacts 58C and 58C1. Contact 58C is connected across lines L1, L2 in series with relay coil 60 having a contact 60C which is closed when coil 60 is deenergized. Contact 60C is connected to control 40. Contact 58C1 is connected across lines L1, L2 in series by time delay relay 62 consisting of a relay coil 64, a capacitor 66 and an adjustable resistor 68. The relay 62 has normally closed contacts 64C and 64C1. Contact 64C controls the operation of control 52 and contact 64C1 controls the operation of control 38.

The operation of my device is as follows: Assuming that contacts 30, 32 and 50 are closed with the line operating at maximum speed and that the load on the generator 42 exceeds a predetermined amount, relay coil 56 will be energized to close its contact 56C. This in turn will energize relay coil 58 opening its contacts 58C and 58C1. Opening of contact 58C deenergizes relay 60 closing contact 60C, thus causing control 40 to reduce the speed of the line to the minimum speed for proper plating. This will decrease the load on generator 42 and if the decrease is sufficient to bring the load below the predetermined allowable maximum, relay 56 will be deenergized thus returning the circuits to their original condition with the line operating at normal speed. Opening of contact 58C1 causes capacitor 66 to discharge through coil 64 and resistor 68 so that coil 64 will not be deenergized until capacitor 66 is nearly discharged. Therefore, if the load for any reason persists above the allowable maximum for a predetermined time the relay coil 64 will become deenergized and its contacts 64C and 64C1 will close. Closing of contact 64C will open contact 50 through control 52 and thus stop motor generator set 42 and 46. Closing of contact 64C1 through control 38 will open contact 30 and thus stop the line. Since the time required for relay 62 to drop out depends on the current stored in capacitor 66 and the resistances of coil 64 and resistor 68 the time may be varied by changing the setting of capacitor 66 and/or resistor 68.

While one embodiment of my invention has been shown and described it will be apparent that other adaptations and modifications may be made without departing from the scope of the following claims.

I claim:
1. A continuous strip processing line comprising a processing section, a generator, a circuit between said generator and processing section, a current sensing device in said circuit, means controlled by said current sensing device to slow down the speed of said processing line when the load on said generator exceeds a predetermined amount, and means controlled by said current sensing device to stop said processing line and generator if the said load persists for a predetermined time.

2. A continuous strip processing line comprising a processing section, a generator, a circuit between said generator and processing section, a current sensing device in said circuit, a relay connected to said current sensing device, means controlled by said relay to slow down said processing line when the load on said generator exceeds a predetermined amount, and time delay means controlled by said relay to stop said processing line and generator if the said load persists for a predetermined time.

3. A continuous strip plating line comprising a plating section, a generator, a circuit between said generator and plating section, a drive motor for pulling said strip through said line, a current sensing device in said circuit, a relay connected to said current sensing device, a second relay controlled by said first relay to slow down said drive motor when the load on said generator exceeds a predetermined amount, and a time delay relay controlled by said first relay to stop said drive motor and generator if the said load persists for a predetermined time.

4. A continuous strip plating line comprising a plating section, a generator, a circuit between said generator and plating section, a drive motor for pulling said strip through said line, a current sensing device in said circuit, a relay connected to said current sensing device and having a normally open contact, a second relay in circuit with said normally open contact, said second relay having two normally closed contacts, a third relay in circuit with the first of said normally closed contacts, means controlled by said third relay to slow down said drive motor, a time delay relay in circuit with the second of said normally closed contacts, and means controlled by said time delay relay to stop said drive motor and generator.

References Cited in the file of this patent

UNITED STATES PATENTS

| | | |
|---|---|---|
| 1,309,733 | Hellmund | July 15, 1919 |
| 2,050,863 | Starie | Aug. 11, 1936 |
| 2,292,511 | Ferm | Aug. 11, 1942 |
| 2,325,401 | Hurlston | July 27, 1943 |
| 2,427,661 | Cook | Sept. 23, 1947 |
| 2,479,317 | Cook | Aug. 16, 1949 |
| 2,488,856 | Few | Nov. 22, 1949 |
| 2,576,074 | Nachtman | Nov. 20, 1951 |
| 2,797,918 | McArthur et al. | July 2, 1957 |
| 2,820,004 | Rendel | Jan. 14, 1958 |
| 2,998,175 | Topping | Aug. 29, 1961 |

FOREIGN PATENTS

| | | |
|---|---|---|
| 203,786 | Australia | May 31, 1955 |